United States Patent [19]
Ashburn et al.

[11] Patent Number: 5,687,340
[45] Date of Patent: Nov. 11, 1997

[54] REDUCED AREA FLOATING POINT PROCESSOR CONTROL LOGIC UTILIZING A DECODER BETWEEN A CONTROL UNIT AND THE FPU

[75] Inventors: Jon L. Ashburn; Theodore G. Rossin, both of Fort Collins, Colo.

[73] Assignee: Hewlett-Packard Company, Palo Alto, Calif.

[21] Appl. No.: 442,544

[22] Filed: May 16, 1995

[51] Int. Cl.[6] .................................................. G06F 9/302
[52] U.S. Cl. ........................... 395/384; 395/563; 395/598
[58] Field of Search ............................. 364/748; 395/800, 395/561, 562, 563, 387, 750, 485, 597, 598, 384, 385, 386, 388, 389

[56] References Cited

U.S. PATENT DOCUMENTS

| | | | |
|---|---|---|---|
| 4,229,801 | 10/1980 | Whipple | 364/748 |
| 4,866,652 | 9/1989 | Chu et al. | 364/748 |
| 4,887,084 | 12/1989 | Yamaguchi | 341/160 |
| 5,070,475 | 12/1991 | Normoyle et al. | 395/387 |
| 5,095,460 | 3/1992 | Rodeheffer | 395/673 |
| 5,265,258 | 11/1993 | Fiene et al. | 395/485 |
| 5,339,266 | 8/1994 | Hinds et al. | 364/748 |
| 5,392,437 | 2/1995 | Matter et al. | 395/750 |
| 5,394,558 | 2/1995 | Arakawa et al. | 395/800 |
| 5,619,664 | 4/1997 | Glew | 395/394 |

Primary Examiner—Tod R. Swann
Assistant Examiner—Keith W. Saunders

[57] ABSTRACT

A control logic unit outputs a group of encoded control signals that have less redundancy than the FPU signals needed to control a floating point processor, thus requiring fewer signal lines using less area. Decoders electrically connected between the control logic unit and the floating point processor decode the control signals to provide the FPU signals. If the number of control signals is one less than the number of FPU signals, a priority encoder is used as the decoder, unless the FPU signals include a power savings signal. Otherwise a custom decoder is used. The most active signal of the group of FPU signals is selected as the signal to be eliminated when a priority encoder is used.

20 Claims, 5 Drawing Sheets

REDUCED AREA FLOATING POINT PROCESSOR CONTROL LOGIC UTILIZING A DECODER BETWEEN A CONTROL UNIT AND THE FPU

BACKGROUND OF THE INVENTION

1. Field of the Invention

The invention in general relates to control logic in a digital integrated circuit, and more particularly the control logic for a floating point processor.

2. Statement of the Problem

As is known in the art, general purpose floating point processors usually include computorial units such as an arithmetic logic unit (ALU), a multiplication unit, and a divide square root unit, together with an associated register file. Such a floating point processor is typically used to perform floating point operations in conjunction with control units, often implemented as state machines, which control units or state machines provide control signals to the floating point processor via control lines. For simplicity, floating point processors are often defined such that an individual logical portion of the floating point core, such as the ALU, is controlled separately from the other portions. This separate control requires separate control lines from the control units to the individual portions of the floating point logic unit which are separately controlled. As a result, the control lines, taken together, contain redundant information. The operating state of the control lines also usually contains redundant information. For example, the floating point ALU is typically used to do floating points adds with both operands coming from the register file and the result being put back into the register file. In this case, sourcing the operands from the register file and performing an add operation on them could be the default state. Thus, since this default state could be implemented without control signals, a system that includes control signals for this state contains a redundancy. An additional form of redundancy resides in power saving signals which exist solely to decrease power consumption of a portion of the floating point core when it is not being used. That is, there is a relationship between the state of the control lines when a given portion is not being used and the power saving signals, since the control lines are normally in a given state when the portion is not being used, which relationship inherently implies redundant information.

In the prior art, the method of reducing such redundancies in the control lines has been to attempt to design the total system so that the redundancies are minimized. In particular, the logic of the state machines that drive the floating point control lines would be optimized to try to eliminate redundancies. However, the practical constraints of circuit design have made this difficult. Timing constraints, gate fan-out constraints, and finite available optimization resources am some of the limitations that prevent optimization. Complex designs are usually done by more than one engineer, and thus the redundancies remain across partitions in the design. Further, if a human is doing the logic synthesis, it is very difficult and takes long periods of time for the human to eliminate redundancies within the design. If, on the other hand, the logic synthesis is done by a computer, with the current state of the art of logic design software, the problem becomes even worse: current software designs require the splitting of complex state machines for logic synthesis and the shear complexity of logic design when many components are involved requires approximations which prevent the systems from being able to completely eliminate redundancies. Thus, regardless of the methods used in the design of a circuit, the logic redundancies cannot be eliminated, and therefore the integrated circuit area required to implement the control for a given floating point algorithm becomes larger than needed.

The more complex the circuit design, the greater becomes the problem. The more complex the design, the more difficult it is to eliminate redundancies, and thus, the ability to control the logic area becomes worse just when it is needed most. The extra area required for a circuit caused by the redundancies increases the cost of the device. It can also impact the functionality of the device, since often the desirable functions to put into a chip are greater than the area allowed for the design, and the usual result is that some functions must be eliminated.

The complexity of integrated circuits is growing faster than the capabilities of circuit design tools. Thus the redundancy problem is increasing, and it would be highly desirable to have a simple and easily implemented method and apparatus for eliminating redundancies in the control logic for a floating point processor and reduce the area required by the control logic.

SUMMARY OF THE INVENTION

The present invention solves the above problem by designing the vadous control logic unit state machines to encode their control signals to eliminate redundant information. This reduces the number of control lines between the control logic unit state machines and the floating point processor. One or more decoders are placed just before the floating point unit logic to decode the coded control signals into the full set of signals required by the floating point processor logic.

In the preferred embodiment, the signals required to operate the floating point processor are divided into groups related to the mathematics control functions used in the processor, such as the source for an operand, the format of an operand, or the operation code for a processor logic portion, such as the ALU. Each group is analyzed for redundancies, a coded reduced set of signals is created that eliminates the redundancies, and the control unit is redesigned to produce the reduced set of signals.

If the reduced set of signals contains just one less signal than the redundant set, a priority encoder is used as the decoder. The use of priority encoders, in combination with making the default state of the control unit the same as the lowest priority state, have an additional advantage of relieving the control lines from the task of carrying the typical or default operating state information, which is not removed by encoding/decoding. Furthermore, priority encoders are easy to retrofit into existing control designs since the signals and the meaning of the signals on the control lines generated by a given state machine does not change.

A custom decoder, rather than a priority encoder, is used in the case where the "extra" signal, i.e. the signal that is eliminated in the above scheme, is due to a power saving being present, because, with a priority encoder, one signal would always be on, and this would not save power. A custom decoder format is also used if the reduced set of signals contains two or more signals less than the redundant set of signals.

In the prior art, this method of substituting decoders for control lines seemed as though it may actually increase the area required by the integrated circuit, since the decoders themselves take up area in the integrated circuit. However, an example shows that this is not so, at least for very complex designs using many state machines. In one embodiment, one signal that, without the invention, would be produced by the control logic unit state machines, is simply eliminated, then recreated by a priority encoder at the floating point unit. Since the dropped signal no longer needs to be created by the control logic unit state machines, the logic of the state machines is reduced. If the dropped signal is chosen to be the signal that changes state the most, the logic of the state machines can be further reduced. This reduction of logic fans out into further reduction, since both humans and software driven logic design systems can more effectively reduce redundancies in logic design if the logic is less complex to begin with. This further reduces the area required by the integrated circuit. Since a typical graphics accelerator, or other digital circuit that includes a floating point processor, includes many control logic state machines for each floating point processor, this simplification of the state machine design multiplies itself by the number of state machines, which multiplies the area reduction that results.

The invention provides a digital circuit comprising: a plurality of control signal outputs, and control unit means for providing a control unit signal on each of the signal outputs; a floating point unit, the floating point unit including: a plurality of FPU signal inputs, and a plurality of logic means, each of the logic means connected to one of the inputs for performing a predetermined function in response to a predetermined FPU signal; and decoder means electrically connected between the control signal outputs and FPU signal inputs for decoding the control unit signals to provide the FPU signals. Preferably, the control unit signals include a control unit group of signals and the FPU signals include a FPU group of signals, each signal in the control unit group of signals is the same as one of the signals in the FPU group of signals, and the FPU group of signals includes at least one additional signal than the control unit group of signals. Preferably, the one additional signal is a signal that is more active than the majority of the FPU group of signals, and is most preferably the most active signal. Preferably, the control unit includes a default state, and the default state is the state determined by the additional signal. Preferably, the FPU group of signals includes a power saving signal and the decoder means comprises a means for setting all of the FPU group of signals to the off state. Preferably, the floating point processor includes means for performing a plurality of mathematics control functions, and each of the aforesaid groups are related to one of the mathematics control functions. Preferably, the mathematics control functions comprise one or more functions selected from the following functions: ALU operand source, Multiply/Divide operand source, bus source, ALU operand format, multiply/divide operand format, bus format, ALU operation code, multiply/ divide operation code, and register file destination.

In another aspect, the invention provides a floating point processor circuit comprising: a floating point unit including a means for responding to a group of FPU input signals; a control unit for producing a group of control unit output signals, the floating point unit input signals comprising the control unit output signals plus one additional signal; and priority encoder means electrically connected between the control unit and the floating point unit for producing the group of floating point unit input signals from the control unit output signals. Preferably, the one additional signal is a signal that is more active than the majority of the group of FPU input signals.

In a further aspect, the invention provides a method of reducing the area of the control logic for a logic system including a control unit and a floating point unit, the floating point unit operating in response to a plurality of FPU signals, the method comprising the steps of: analyzing the floating point processor to determine redundant information contained in the FPU signals; designing and providing the control unit to provide encoded output signals having less redundancy than the FPU signals; and providing a decoding unit between the control unit and the floating point unit to decode the encoded signals to provide the FPU signals. Preferably, the step of analyzing comprises the steps of dividing the FPU control signals into a plurality of signal groups; and encoding the signals in each of the signal groups to generate a group encoded signal for each signal group; and the encoded output signals comprise the group encoded signals. Preferably, the floating point unit is capable of responding to a plurality of mathematics control functions and the step of dividing comprises determining a plurality of groups, each group related to one of the mathematics control functions. Preferably, the mathematics control functions comprise one or more functions selected from the following functions: ALU operand source, multiply/divide operand source, bus source, ALU operand format, multiply/divide operand format, bus format, ALU operation code, multiply/ divide operation code, and register file destination.

The invention not only provides a reduced area logic circuit due to the elimination of control lines, it also significantly simplifies the control unit logic, making it easier to eliminate redundancies in designing that system. Thus, the simplification of the control area fans out into the simplification of related logic. Numerous other features, objects and advantages of the invention will become apparent from the following description when read in conjunction with the accompanying drawings.

DESCRIPTION OF THE PREFERRED EMBODIMENT

Figure 1:
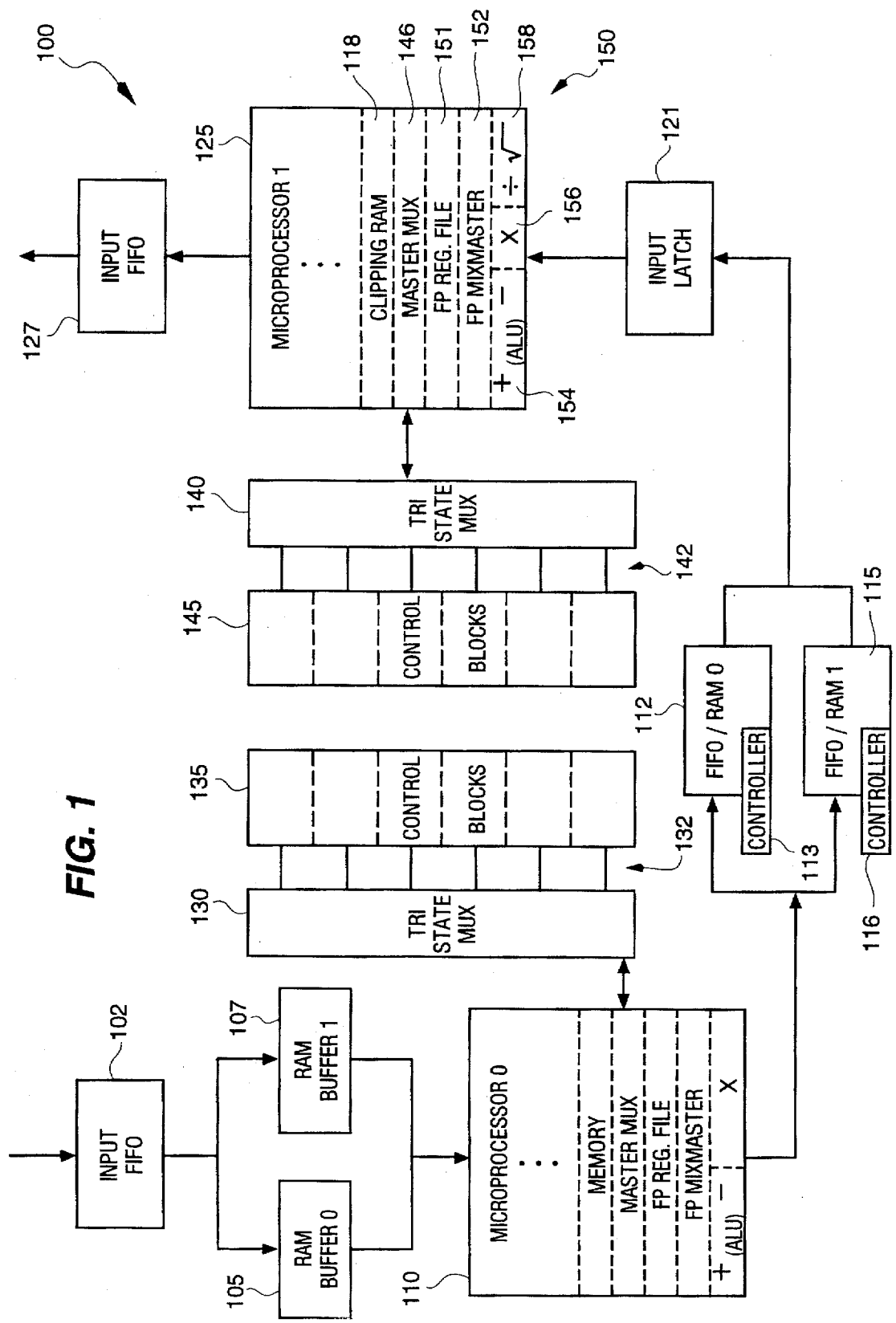
FIG. 1 is a block circuit diagram of a graphics accelerator circuit which includes the floating point processor control logic according to the invention.

The invention will be described in connection with a specific device in which it is employed, i.e. a graphics accelerator chip 100 for use in a three-dimensional imaging system, such as a work station. FIG. 1 illustrates the architecture of such a graphics accelerator chip 100. The chip disclosed in FIG. 1 is an example for illustration only and is not intended to limit the invention to any particular hardware architecture or implementation.

The chip 100 is designed to perform geometric matrix transformations, polygon decompositions, object lighting/ shading, and dipping, perspective adjustments, and plane/ slope equation calculations on randomly oriented polygons and/or vectors. The architecture of chip 100 does not process all three-dimensional primitives, but supports a larger overall three-dimensional processing scheme by quickly and efficiently processing only the most common primitives having the most commonly processed features, plus other operations within the scope of the highly specialized vector processing architectures, to facilitate downstream processing or conversions.

The architecture of chip 100 contains hard-wired control features, dynamic logic floating point cells, and highly customized fixed data paths. It is a two processor vector processing design having a first microprocessor 110 and a second microprocessor 125. Operationally, the first microprocessor 110 pre-processes vertex primitives input by way of a traditional FIFO 102. Dual RAM buffers 105 and 107 provide a staging area from which primitives are accessed by microprocessor 110. Microprocessor 110 is similar to microprocessor 125, which will be discussed below, except that its floating point unit does not include a divide/square root function. Otherwise it includes its own individual memory, master multiplexer, and floating point processor, which communicate with control blocks 135 via tri-state multiplexer 130 and control lines 132. Microprocessor 110 performs initial floating point operations on input primitives including, but not limited to, geometric transformations, partial slope calculations, and other preliminary calculations prior to handing the results off to microprocessor 125 by way of memory 112 and 115. Control logic units 135, sometimes referred to as control blocks, provide address decoding, transformations, decompositions, and positional assistance support.

Memory devices 112 and 115 are controlled by memory controllers 113 and 116, respectively, which implement a hybrid FIFO/RAM memory scheme. Depending on the primitive type and the operations being performed, the memory 112 and 115 are used in a modified FIFO or RAM configuration.

Continuing with FIG. 1, output from memory devices 112 and 115 are directed into the input latch queue 121 for processing by microprocessor 125 where it is integrated with output from the clipping RAM staging device 118. Microprocessor 125 includes clipping RAM 118, which is a general purpose RAM used primarily for clipping, a master multiplexer 146 for communications with control block 145 by way of tri-state multiplexer 140, and floating point processor unit 150 which includes a floating point register file 151, a floating point "mixmaster", which is a specialized multiplexer and data formatter, an arithmetic logic unit (ALU) 154, a multiplier logic unit 156, and a divide/square root logic unit 156. Control blocks 145 provide lighting calculations, clipping, and plane equation features. Completed operations from microprocessor 125 are output on a traditional FIFO queue 127 for subsequent processing beyond the scope of this disclosure. Since the design and function of the portion of the system including control blocks 135, tri-state multiplexer 130, and microprocessor 110 is similar to the portion of the system including control blocks 145, tri-state multiplexer 140 and microprocessor 125, with the exceptions noted above, only the latter portion of the system will be described in detail herein.

Figure 2:
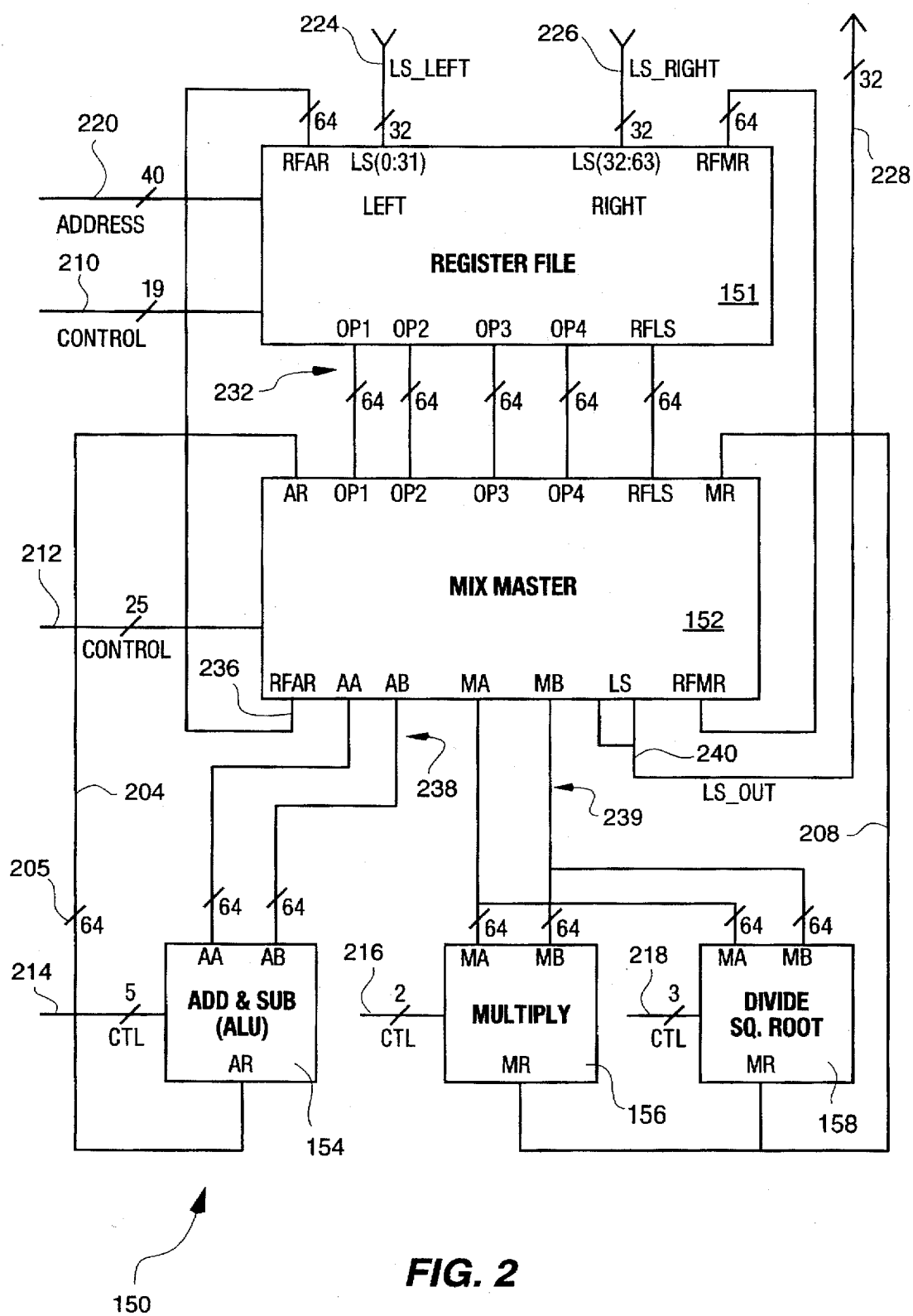
FIG. 2 is a block circuit diagram of the floating point processor in the circuit of FIG. 1.

FIG. 2 shows a more detailed illustration of floating point processor 150. As indicated above, floating point processor 150 includes register file 151, mixmaster 152, ALU 154, multiply logic unit 156, and divide/square root logic unit 156. These portions of the processor are connected to each other by lines, such as bus 204, and are connected to other parts of the circuit 100 (FIG. 1) by control busses 210, 212, 214, 216, and 218, address bus 220, input busses 224 and 226, and output bus 228. Each bus, such as 204 in FIG. 2, represents a number of connecting lines in the integrated circuit 100, the number given next to the slash, such as 205, passing through the bus. For example, bus 204 represents 64 connecting lines capable of carrying 64 bits, while bus 220 represents 40 address lines capable of carrying 40 bits. The busses, such as 204, connecting the portions 151, 152, 154, 156, and 158 of the floating point core 150 all include 64 connecting lines, thereby allowing both single precision, i.e. 32 bit, and double precision, i.e. 64 bit floating point operations. However, in the preferred embodiment described herein, only single precision data is used. In each of the logic portions 151, 152, 154, 158, and 158, the inputs are at the top and the outputs are at the bottom. The signal names are given at each input and each output; for example, the AR (Arithmetic Result) signal is output by ALU 154, carried by bus 205, and input to mixmaster 152.

Register file 151 is preferably a 32×64 bit register. In the preferred, single precision, embodiment it is configured as sixty-four 32-bit registers, rather than thirty-two 64-bit registers. In this configuration, the LS left bus 224 can only write to the left haft of the register, i.e., registers 0 through 31, while the LS right bus 226 can only write the right haft of the register, i.e. registers 32 through 64. The mixmaster 152 routes data from one of seven sources to one of five destinations, four of which are floating point operands. It also performs data formatting for single versus double precision floating point operations and for single precision integer operations. The ALU 154 performs arithmetic operations, i.e. addition and subtraction, the multiply logic 158 performs multiplications, and the divide/square root logic 158 performs divisions and square roots.

Register file 151 is connected to microprocessor master multiplexer 146 via LS left bus 224 and LS right bus 226. Forty Address lines 220 and nineteen control lines 210 connect register file 151 to control blocks 145 via decoders 320 (FIG. 3), and tri-state multiplexer 140. Five sixty-four bit busses 232, carrying signals OP1 through OP4 and RFLS, connect each of the outputs of register file 151 to a corresponding input of mixmaster 152. Mixmaster 152 is connected to control blocks 145 via decoders (FIG. 3) and tri-state multiplexer 140 by a twenty-five line control bus 212. Two sixty-four bit busses, such as 236, connect two outputs of mixmaster 152 to register file 151 and carry the RFAR and RFMR signals, two sixty-four bit busses carry the AA (ALU operand A) and AB (ALU operand B) signals from mixmaster 152 to ALU 154, two sixty-four bit busses 239 carry the MA (Multiply/Divide operand A) and MB (Multiply/Divide operand B) signals from mixmaster 152 to the multiplication logic 156 and the divide/square root logic 156, and one thirty-two bit bus 240 carries the LS OUT signal to master microprocessor multiplexer 146 (FIG. 1). Five control lines 214 connect ALU 154 to control blocks 145 via decoders (FIG. 3) and tri-state multiplexer 140, and similarly two control lines 216 and three control lines 218, respectively, so connect multiplication logic 156 and divide/square root logic 158 to the control blocks 145. A sixty-four bit bus 204 carries the AR signal from the ALU output to an input of mixmaster 152, while a sixty-four bit bus 208 carries the MR (Multiplier Result) signal from the outputs of multiplication logic 156 and divide/square root logic 158 to an input of mixmaster 152.

For ease of understanding, the mixmaster 152 is shown as a separate logic unit with connections to other separate logic units, which depiction, if interpreted strictly, could imply a restriction to functionality that is not present in the actual system. For example, the mixmaster can apply as the AA signal, i.e. the ALU operand A, any register in the register file, the signal from either the LS left bus or the LS right bus, the MR bus signal, or the AR bus signal. Thus, there are 68 possible sources for the ALU operand A.

Considering that there must be lines corresponding to control busses 210, 212, 214, 216, and 218 and address bus 220 between each of the control units 145 and the tri-state multiplexer 140, it can be seen that any significant reduction in the lines corresponding to these busses, can significantly reduce the area required by the integrated circuit. The first step to reduce the number of lines is to analyze the floating point processor unit 150 to determine redundant information contained in the floating point unit (FPU) signals that are available to the floating point processor 150 and are actually used by the floating point algorithms to perform the floating point operations, i.e. the signals that are carded by the control and address busses 220, 210, 212, 214, 216, and 218. The analysis is essentially as follows: the functions carried out by the signals are examined and compared to the signals carried by the control lines to control performance of the functions, and a reduced set of signals, and thus control lines, are determined that will transfer the same information carried by the control lines. For example, there is a group of signals that determine the source for the ALU operand A, i.e. the signal that is input at AA in ALU logic 154. These signals are ar 2aa, nfbypaa, rf2aa, mr2aa, lsd2aa, plus the signals on the five address lines that carry the register address for source, a total of ten signals. As indicated above, there are sixty-eight possible sources for the ALU operand A. Thus one can devise a seven-bit code, utilizing seven signals and seven control lines, to communicate which of the sixty-eight possible sources that should be applied to the operand A, rather than the ten signals listed above which require ten control lines to transfer them.

Similarly, one can find fourteen other groups of signals that carry redundant information and can be coded to reduce the numbers of signals, and thus the number of control lines, that are required. Each of the fifteen groups are listed below, showing the function performed, the number and identity of the different items, e.g. different sources, in the group, the full set of control signals in the group which are to be encoded, and the number of signals before and after encoding:

1. ALU A operand source: 68 possible sources (regfile, AR, MR, LS left, LS right); signals: ar2aa,nfbypaa, rf2aa,mr2aa,lsd2aa,reg_aa_address [0:4] (10 signals, 7 after encoding);
2. ALU B operand source: 68 possible sources (regfile, AR, MR, LS left, LS right); signals: ar2ab,nfbypam, rf2ab,mr2ab,lsd2ab,reg_ab_address[0:4] (10 signals, 7 after encoding);
3. Multi./Div. A operand source: 68 possible sources (regfile, AR, MR, LS left, LS right); signals: ar2ma, nfbypmb,rf2ma,mr2ma,lsd2ma,reg_mb_address[0:4] (10 signals, 7 after encoding);
4. Multi./Div. B operand source: 68 possible sources (regfile, AR, MR, LS left, LS right); signals: ar2mb, nfbypmb,rf2mb,mr2mb,lsd2mb, reg_mb$_{13}$ address [0:4] (10 signals, 7 after encoding);
5. LS OUT bus source: 67 possible sources (regfile, AR, MR, none); signals: reg_lsout_address[0:4],mxl2ls, rfl2ls,mr2ls,ar2ls (9 signals, 7 after encoding)
6. ALU A operand format: 3 possible formats (float left regfile, float right regfile, integer right regfile); signals: fslaa,fsraa,israa (3 signals, 2 after encoding);
7. ALU B operand format: 2 possible formats (float left regfile, float right regfile); signals: fslab,fsrab (2 signals, 1 after encoding);
8. Mult./Div. A operand format: 2 possible formats (float left regfile, float right regfile); signals: fslma,fsrma (2 signals, 1 after encoding);
9. Mult./Div. B operand format: 2 possible formats (float left regfile, float right regfile) signals: fslmb,fsrmb (2 signals, 1 after encoding);
10. AR bus format: 2 possible formats (float, integer); signals: isar,fsar (2 signals, 1 after encoding);
11. ALU operation code (OPCODE): 7 possible operations (add, subtract, convert float to integer, convert integer to float, absolute value, copy, none/power off); signals: alu_op[0:3],alu_pwr (5 signals, 3 after encoding);
12. Mult./Div. operation code (OPCODE): 4 possible operations (multiply, divide, square root, none/power off); signals: md_op,mpy_power,m_div,ds_start (4 signals, 2 after encoding);
13. Regfile destination from AR: 65 possible destinations (regfile, none/power off); signals: reg_arw_address [0:4],arw_l,arw_r,arw_valid (8 signals, 7 after encoding);
14. Regfile destination from MR: 65 possible destinations (regfile, none/power off); signals: reg_mrw_address [0:4],mrw_l,mrw_r,mrw_valid (8 signals, 7 after encoding);
15. Regfile destination from LS: 65 possible destination (regfile, none/power off); signals: reg_iow_address [0:4],iow_l,iow_r,iow_valid (8 signals, 7 after encoding).

The invention may be implemented by "encoding", at the control blocks 145, the signals as indicated in the list of groups above, then decoding them after the tri-state multiplexer 140. The term "encoding" is placed in quotation marks above because, in the preferred embodiment, special encoding circuitry is not used. Rather, the term encoding herein refers to changing the circuitry of the control blocks 145 so that the signals at the outputs have a new definition that corresponds to the "encoded" signals. That is, the control block state machines have different state definitions with a reduced number of output signals. For ease of reference, the original "uncoded" signals, which are the same as the signals after decoding just before the signals are applied to the floating point processor unit 150, will be referred to the FPU signals, while the "encoded" signals, i.e. the reduced set of signals, which are the signals that the changed control block units 145 produce, will be called the control unit signals, or CU signals. It is readily seen that each of the groups defined above actually define two groups of signals, i.e. a group of FPU signals, and a group of CU signals. Thus, the list defines fifteen FPU signal groups and fifteen CU signal groups, each FPU signal group corresponding to one of the CU signal groups, that is, each original group of FPU signals having a corresponding reduced set of CU signals.

In the actual circuit, the control blocks 145 are located much farther from the tri-state multiplexer 140 than the drawing suggests. Thus, such an encoding/decoding scheme saves significant area in the integrated circuit. As will be seen below, in the preferred embodiment, additional area-saving concepts were also used.

An examination of the groups I through 15 described above shows that the encoding of some groups reduces the number of signals by one, and the encoding of other groups reduces the signals by two or more. For those groups in which the signals were reduced by two or more, a custom encoding/decoding scheme was used. For many of the groups the reduced set of signals has only one less signal than the original set of signals. For most of these groups a modified encoding/decoding scheme was used. In these groups, one signal was simply eliminated from each of the control units 145, and a priority encoder was used to recreate the dropped signal between the tri-state multiplexer 140 and the floating point processor 150.

The use of a priority encoder has several advantages. The dropping of one signal permits the design of the control block units 145 to be simplified, since the circuitry for creating the dropped signal can be eliminated. This advantage occurs whether or not a priority encoder is used, since, for each decoder, there always is at least one less signal to be produced by the control units 145. With the priority encoder, however, the remaining CU signals have the same definitions as the original FPU signals. This allows the priority encoder to be easily retrofitted into the existing control design. Moreover, priority encoders are very simple devices that use up little integrated circuit areas.

A further area reduction is created by the use of a priority encoder if the signal that is dropped is selected to be the signal that is most active, that is, the signal that changes state the most. In general, the most active signal will require more output logic to produce it. Thus, selecting the most active signal for elimination, eliminates a larger portion of the control unit circuitry. This makes it easier to design the control unit circuitry, and easier to further optimize the circuitry in the design stage, thus further reducing the area occupied by the circuitry. If there are no signals that are most active, that is, there are several "most" active signals that are equally active, then one of these most active signals is eliminated, preferably the one that includes the most circuitry in the control unit, if this can be determined.

The simplicity of priority encoders results in at least one output of the encoder always being on. That is, when the priority signals are not on, the last or recreated signal is always on. In contrast, custom decoders can be created so that them is one decode state in which all outputs are off. As mentioned above, some of the redundancies in the FPU groups of signals are due to the fact that there is a signal in the group that indicates that a specific logic portion, such one of logic units 151, 152, 154, 156, or 158, should be turned off because it is not being used. If a priority encoder were used to decode the CU signals for a group including a power saving signal, there would always be an ON signal among the signals applied to the floating point processor 150. This would cause the use of power, and thus would not save power. Thus, for the groups that involve only one less signal in the CU group of signals and also include a power saving signal, i.e. groups 13, 14, and 15, a custom decoder was used instead of a priority encoder.

Summarizing the above, a priority encoder was used for groups 6, 7, 8, 9, and 10 above, since the CU group of signals for each of these groups have one less signal than the corresponding FPU group of signals, and the FPU group does not include a signal that is a power saving signal. A custom decoder was used for groups 1–5 and 11–15.

Figure 3:
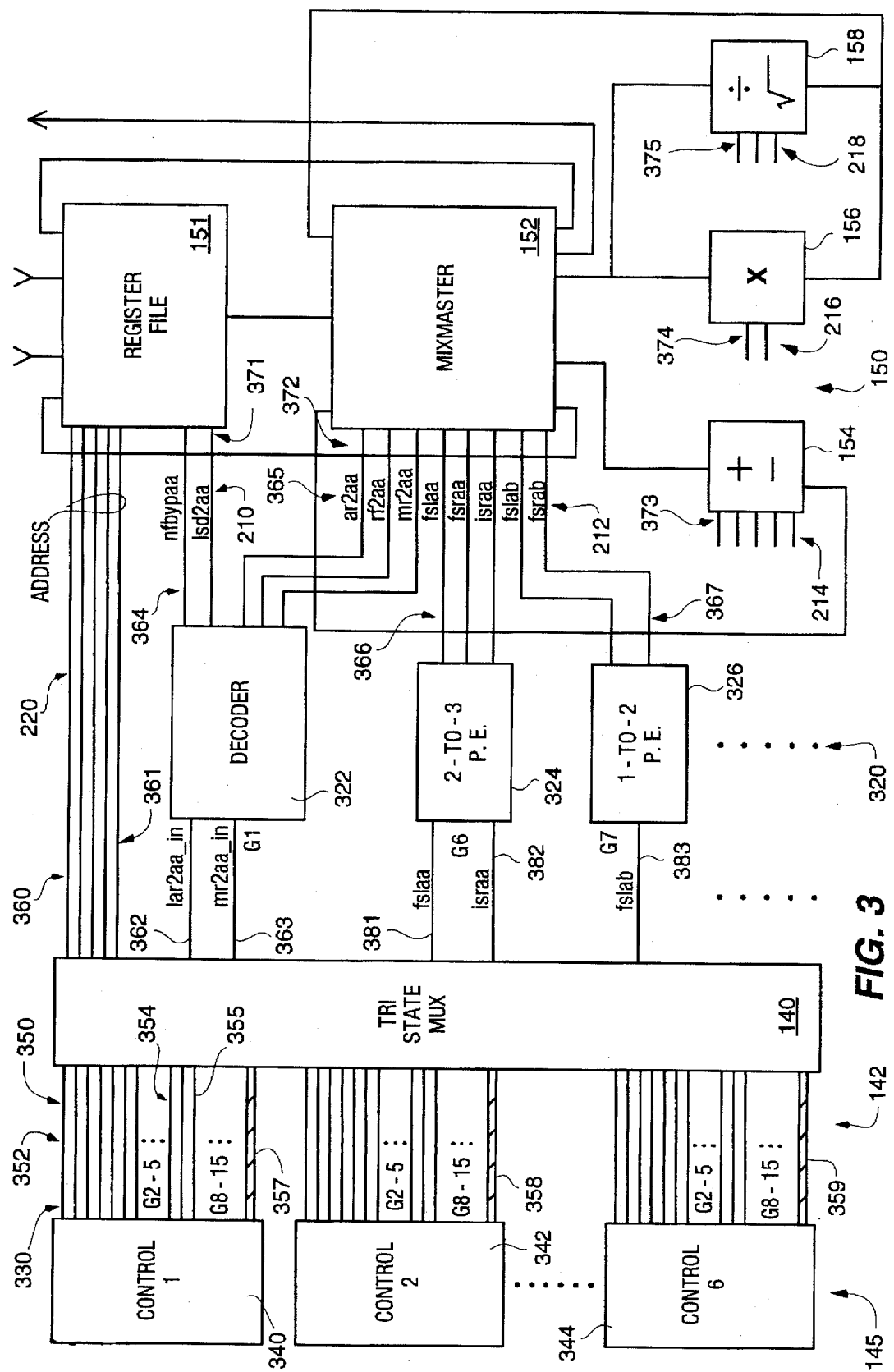
FIG. 3 is a block circuit diagram of a portion of the control logic and floating point processor of FIG. 1, illustrating the electrical connections between the two.

FIG. 3 shows the detailed connections between the control units 145, the tri-state multiplexer 140, the decoders 320 and the floating point multiplexer 150 for several exemplary groups of signals. The various circuit components, such as the floating point processor 150 are shown in a simplified form in this figure so that the connections will be clear. The connections of the group I signals are shown as exemplary of the use of a custom decoder 322. The connections of the group 6 signals are shown as exemplary of the use of a 2-to-3 priority encoder 324, and the connections of the group 7 signals are shown as exemplary of the use of a 1-to-2 priority encoder 326.

The embodiment of FIG. 3 includes six control logic units 145, though only three 340, 342, and 344 are expressly shown. Each control unit, such as 340, includes control signal outputs, such as 330, on each of which a control signal is provided by the unit 340. Each of the outputs 330 are connected to tri-state multiplexer 140 by a separate line, though only the lines for groups 1, 6, and 7 are expressly shown. For example, the lines 350 connecting control unit 340 and tri-state multiplexer 140 include seven group 1 lines 352, followed by three dots indicating the twenty-eight lines of groups 2 through 5, then two group 6 lines 354 and one group 7 line 355, then three more dots representing the twenty-nine lines of groups 8 through 15. Finally there is a thick "cable" 357 representing other connections between control unit 340 and microprocessor 110 that pass through tri-state multiplexer 140. Likewise each of the control units 342 through 344 are shown with the same connections to the multiplexer 140, though in general, the connectors 357, 358 and 359 representing the lines in addition to the lines of the groups 1–15 will be different for each control unit 145, since some control units will have lines that others don't have. Moreover, it is possible that not all the lines for the fifteen groups will be present for all control units, though usually if a control unit has a need to control floating point unit 150 it will have all the control lines 350.

The multiplexer 140 multiplexes the control units 145 to the decoders 320 and the floating point processor unit 150, thus it is connected to the decoders 320 and the floating point processor 150 through a set of lines 360 which correspond to the lines 350 between one of the control units, such as 340, and the multiplexer 140; that is, for each of the lines 352, 354, 355, and 357 there is a corresponding line among lines 360.

Referring to the summary of the lines for group 1 given above, it is seen that five of the lines are address lines, which do not contain redundant information since they are already coded. Thus, no decoding is required for these lines 361, and these five lines 361 are in both the FPU group 1 and the CU group 1. Thus, these lines 361 run directly from multiplexer 140 to register file 151. The other two CU group 1 lines, 362 and 363, carry the encoded information for five FPU signals, namely ar2aa, nfbypaa, rf2aa, mr2aa, and lsd2aa, which information is contained in two signals, ar2aa_in and mr2aa_in, where the underlined space indicates a space, as is conventional in the art. Thus, a decoder 322 is required to decode the two CU group signals on lines 262 and 363 into five FPU group signals on lines 364 and 365. Two of the signals, i.e. nfbypaa and lsd2aa, are applied by the decoder to register file 151, and the lines 364 carrying them form part of the control bus 210 applied to the register file 151 inputs 371. The other three signals, ar2aa, rf2aa, and mr2aa, are applied to the mixmaster 152, and the lines 365 carrying them form part of the control bus 212 applied to the mixmaster 152 inputs 372.

Of the group six FPU signals, the fsraa signal is the most active, since the design tends to use floating point more than integer and the right haft of the register file 151 more than the left. Thus, the fsraa signal is eliminated in the design of the control units 145. The remaining two signals, fslaa and israa, are applied to the inputs of priority encoder 324 on lines 381 and 382, respectively. The fsraa signal is recreated by 2-to-3 priority encoder 324, and the three signals, fslaa, fsraa, and israa, are applied to mixmaster 152 by decoder 324, and the three lines 366 carrying them form part of the control bus 212 applied to the inputs 372 of mixmaster 152.

Of the group 7 FPU signals, the fsrab signal is the most active, and thus is dropped from the CU group 7 signals. The remaining signal, fslab, is applied to priority encoder 326 on line 383. The fsrab signal is recreated by 1-to-2 priority encoder 326, and the two signals, fslab and fsrab, are applied by decoder 326 to mixmaster 152, and the lines 367 carrying them form part of the control bus 212 applied to the inputs 372 of mixmaster 152.

The remainder of the lines 360 which correspond to the groups 2 through 5 and the groups 8 through 15 lines 350, are also appropriately decoded by decoders 320 into the FPU signals given in the listing for the groups above, and applied to the appropriate inputs 371, 372, 373, 374, and 375 of register file 151, mixmaster 152, ALU 156, multiplication logic unit 156, and divide/square root logic unit 158, respectively. For clarity, not all the inputs of register file 151 and mixmaster 152 are shown. Now that examples of the connections have been given, those skilled in the art of floating point processors will be able to determine the other appropriate connections based on the signals listed for each of the groups above.

Figure 4:
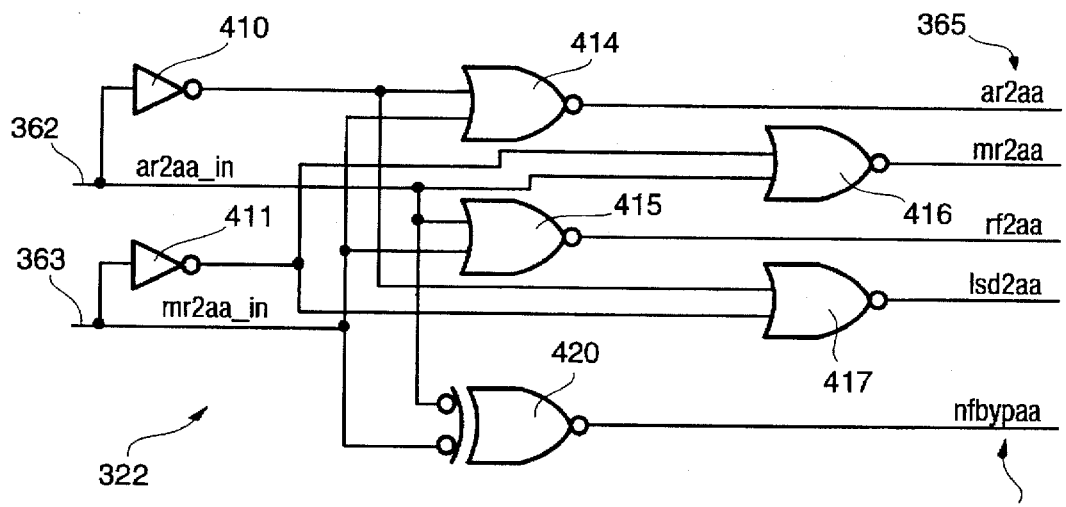
FIG. 4 is a circuit diagram of an exemplary decoder used in the circuit of FIG.

FIG. 4 shows a detailed circuit diagram of the preferred embodiment of the custom decoder 322. Decoder 322 includes inverters 410 and 411, NOR gates 414, 415, 416, and 417 and exclusive NOR gate 420 having two inverted inputs. Line 362 is connected to the input of inverter 410, one input of each of NOR gates 415, 416, and one inverted input of exclusive NOR gate 420. The output of inverter 410 is connected to one input of NOR gates 414 and 417. Line 363 is connected to the input of inverter 411, to the other one of the inputs of each of gates 414 and 415, and the other one of the inverted inputs of gate 420. The output of inverter 411 is connected to the other one of each of NOR gates 416 and 417. The output of NOR gates 414–417 provide the ar2aa signal, the rf2aa signal, the mr2aa signal, and the lsd2aa signals, respectively. The output of exclusive NOR gate 420 provides the nfbypaa signal.

Figure 5:
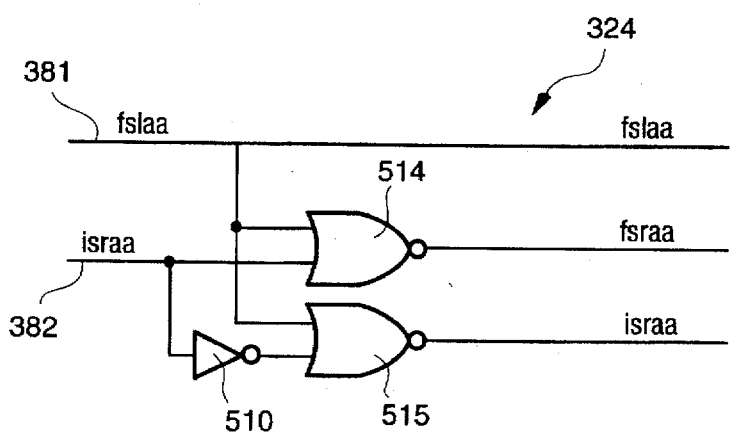
FIG. 5 is a circuit diagram of a 2-to-3 priority encoder used in the circuit of FIG. 3.

FIG. 5 shows the preferred implementation of 2-to-3 priority encoder 324. It includes inverter 510 and NOR gates 514 and 515. Line 381 is connected to one input of each of NOR gates 514 and 515. Line 382 is connected to the input of inverter 510 and the other input of gate 514. The output of inverter 510 is applied to the other input of NOR gate 515. Line 381 carries the fslaa signal through the encoder 324 without change. The outputs of gates 514 and 515 provide the fsraa and israa signals, respectively.

Figure 6:
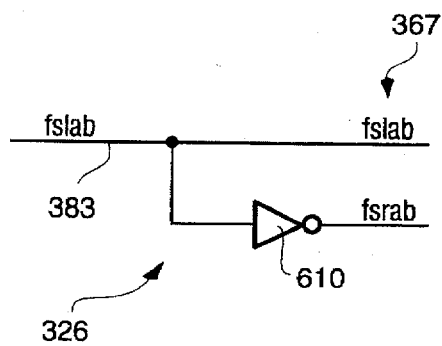
FIG. 6 is a circuit diagram of a 1-to-2 priority encoder used in the circuit of FIG. 3.

FIG. 6 shows the preferred implementation of 1-to-2 priority encoder 326. It is very simple, comprising just one inverter 610. Line 383 is connected to the input of inverter 610 and also passes through the encoder to provide the fslab output signal. The output of inverter 610 provides the fsrab signal.

Figure 7:
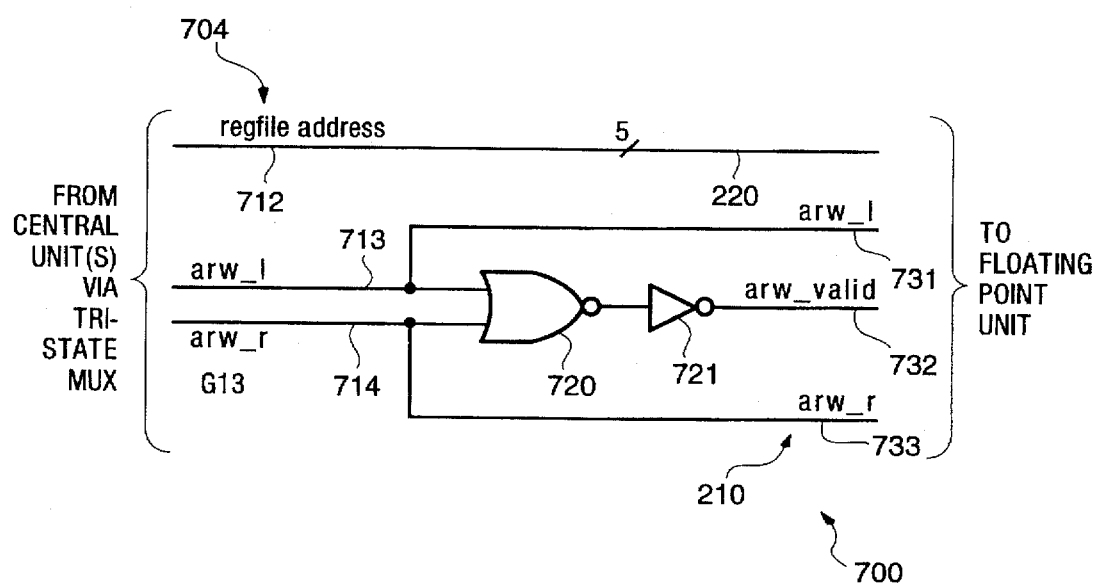
FIG. 7 is a circuit diagram of a decoder used when one of the signals in a group is a power saving signal.

As mentioned above, in the case of the groups that involve only one less signal in the CU group of signals and also include a power saving signal, i.e. groups 13, 14, and 15, a custom decoder was used instead of a priority encoder. FIG. 7 shows an example of a decoder 700 used in such a case, i.e. the decoder for the group 13 signals. In this case the control units 145 are designed so the power saving signal, arw__valid, is not produced. As indicated in the group summary above, there are seven CU signals 704, which include five address signals on lines 712, and the arw__l and arw__r signals on lines 713 and 714, respectively. The address lines 712 pass through without change and become part of bus 220 (FIG. 2). Decoder 700 includes a NOR gate 720 and an inverter 721. Line 713 connects to one input of NOR gate 720 and also passes the signal arw__l through without change on line 731. Line 714 connects to the other input of NOR gate 720 and also passes the signal arw__r through without change on line 733. The output of NOR gate 720 connects to the input of inverter 721, and the output of inverter 721 provides the arw__valid signal, which is the power saving signal, on line 732. Lines 731–733 form part of the control bus 210 (FIG. 2) to the register file 151. As a result of using this custom decoder 700, all of lines 731–733 are off when the power savings state is signaled.

The other decoders 320 for the groups 2–5, 8–12 and 14–15 can be designed by those skilled in the art from the information given above. Similarly, now that the invention has been disclosed in detail, those skilled in the art can find many other encoding/decoding formulations and implementations that will reduce the area of the integrated circuit of FIG. 1 and any other integrated circuit utilizing floating point processing units.

There has been described a novel floating point processor control logic circuit that significantly reduces the number of control lines and thus the area the logic occupies in an integrated circuit, and which has many other advantages. It is evident that, now that the invention has been fully disclosed, those skilled in the art may now make numerous uses and modifications of the specific embodiment described, without departing from the inventive concepts. For example, now that it is seen that the decoders used in the logic use up much less area than the control lines they replace, other designs that substitute decoders for control lines may also be used. Or equivalent components or circuits can be substituted for the various components and circuits described. Additional features may be added. A greater or lesser number of parts may be used. Consequently, the invention is to be construed as embracing each and every novel feature and novel combination of features present in and/or possessed by the logic circuit described.

What is claimed is:

1. A digital circuit comprising:
   a plurality of control signal outputs, and a control unit providing a control unit signal on each of said signal outputs;
   a floating point unit (FPU), said floating point unit including: a plurality of FPU signal inputs, and a plurality of logic units, each said logic units connected to one of said inputs for performing a predetermined function in response to a predetermined FPU signal; and
   a decoder electrically connected between said control signal outputs and FPU signal inputs for decoding said control unit signals to provide said FPU signals.

2. A digital circuit as in claim 1 wherein said control unit signals include a control unit group of signals and said FPU signals include a FPU group of signals, and wherein said each signal in said control unit group of signals is the same as one of said signals in said FPU group of signals, and further that said FPU group of signals includes at least one additional signal than said control unit group of signals.

3. A digital circuit as in claim 2 wherein said at least one additional signal is a signal that is more active than the majority of said FPU group of signals.

4. A digital circuit as in claim 3 wherein said at least one additional signal is the most active of all of said FPU group of signals.

5. A digital circuit as in claim 2 wherein said control unit includes a default state, and said default state is the state determined by said at least one additional signal.

6. A digital circuit as in claim 2 wherein said FPU group of signals includes a power saving signal and said decoder means comprises a means for setting all of the FPU group of signals to the off state.

7. A digital circuit as in claim 2 wherein said decoder comprises a priority encoder.

8. A digital circuit as in claim 1 wherein said floating point unit includes a mathematics control logic unit performing a plurality of mathematics control functions, and wherein said control unit signals are divided into groups, each group related to one of said mathematics control functions.

9. A digital circuit as in claim 8 wherein said mathematics control functions comprise one or more functions selected from the following functions: ALU operand source, Multiply/Divide operand source, bus source, ALU operand format, multiply/divide operand format, bus format, ALU operation code, multiply/divide operation code, and register file destination.

10. A digital circuit as in claim 1 wherein said control unit comprises a plurality of control units, each having a plurality of said control signal outputs.

11. A digital control circuit as in claim 10 and further including a multiplexer electrically connected between said plurality of control units and said decoder.

12. A digital circuit as in claim 1 wherein said control signal outputs are divided into control unit groups and said FPU signal inputs are divided into FPU signal groups, each of said control unit groups corresponding to one of said FPU signal groups, and wherein said decoder comprises a corresponding decoder connected between each of said control unit groups and the corresponding one of said FPU signal groups.

13. A digital circuit as in claim 12 wherein at least one of said control unit groups contains one less output than the number of inputs in its corresponding FPU signal input group, and said corresponding decoder comprises a priority encoder.

14. A digital circuit as in claim 12 wherein said floating point unit comprises a plurality of separate logic portions, each logic portion including at least one FPU signal input, wherein one of said logic portions includes a logic unit for setting the logic portion into a low-power state, and said corresponding decoder connected to said at least one signal input includes a custom decoder for setting said at least one signal input to the off state.

15. A floating point processor circuit comprising:

a floating point unit (FPU) including a logic unit for responding to a group of FPU input signals;

a control unit for producing a group of control unit output signals, said FPU input signals comprising said control unit output signals plus one additional signal; and a priority encoder electrically connected between said control unit and said floating point unit for producing said group of FPU input signals from said control unit output signals.

16. A circuit as in claim 15 wherein said at least one additional signal is a signal that is more active than the majority of said group of FPU input signals.

17. A method of reducing the area of the control logic for a logic system including a control unit and a floating point unit (FPU), said floating point unit operating in response to a plurality of FPU signals, said method comprising the steps of:

analyzing said floating point processor to determine redundant information contained in said FPU signals;

designing and providing said control unit to provide encoded output signals having less redundancy than said FPU signals; and providing a decoding unit between said control unit and said floating point unit to decode said encoded signals to provide said FPU signals.

18. A method as in claim 17 wherein:

said step of analyzing comprises the steps of dividing said FPU control signals into a plurality of signal groups; and encoding the signals in each of said signal groups to generate a group encoded signal for each signal group; and wherein said encoded output signals comprise said group encoded signals.

19. A method as in claim 18 wherein said floating point unit is capable of responding to a plurality of mathematics control functions and said step of dividing comprises determining a plurality of groups, each group related to one of said mathematics control functions.

20. A method as in claim 19 wherein said mathematics control functions comprise one or more functions selected from the following functions: ALU operand source, multiply/divide operand source, bus source, ALU operand format, multiply/divide operand format, bus format, ALU operation code, multiply/divide operation code, and register file destination.

* * * * *